Dec. 8, 1931.    J. MESZAR    1,835,802
SIGNALING SYSTEM
Filed Sept. 16, 1930
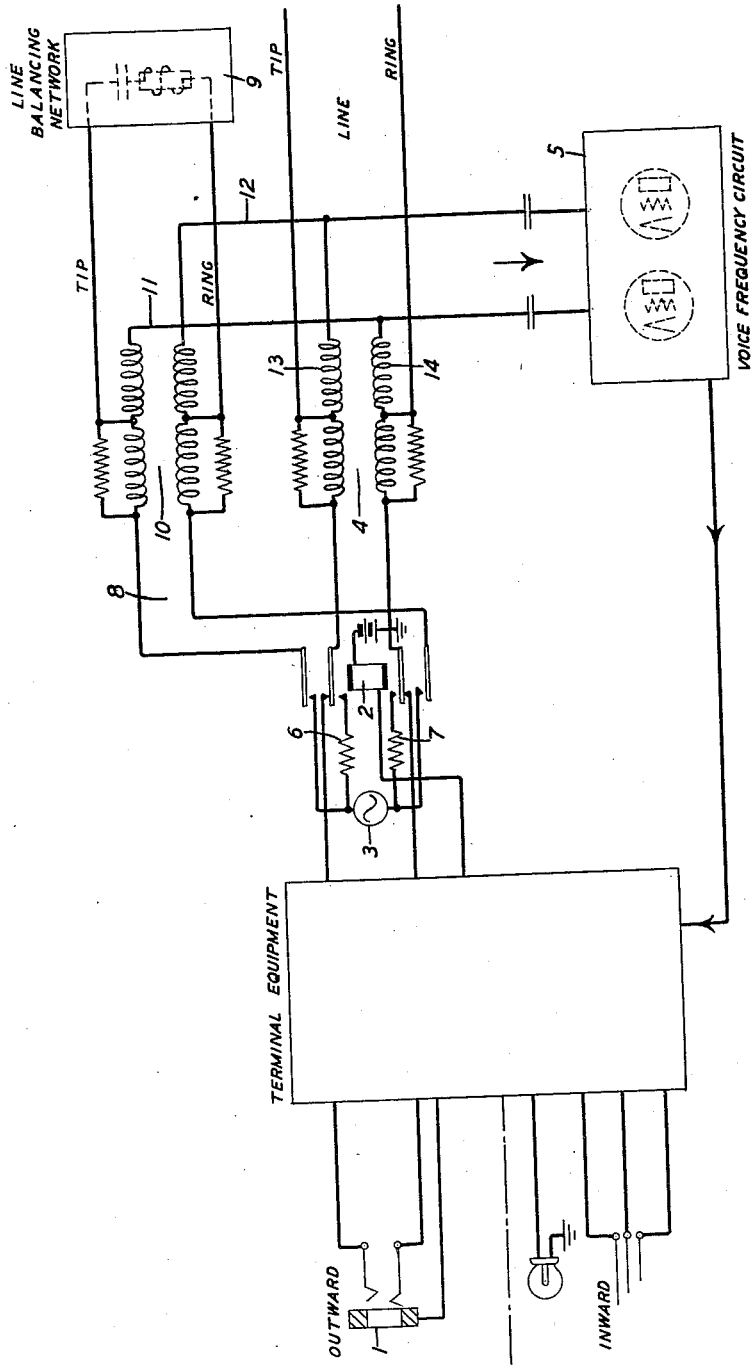
INVENTOR
J. MESZAR
BY John a Hall
ATTORNEY Patented Dec. 8, 1931

1,835,802

UNITED STATES PATENT OFFICE

JOHN MESZAR, OF LONG ISLAND CITY, NEW YORK, ASSIGNOR TO BELL TELEPHONE LABORATORIES, INCORPORATED, OF NEW YORK, N. Y., A CORPORATION OF NEW YORK

SIGNALING SYSTEM

Application filed September 16, 1930. Serial No. 482,259.

This invention relates to directional signal receiving systems and more particularly to arrangements for connecting signal receiving circuits to a line in such a manner that the receiving apparatus will be actuated in response to alternating current signals of a certain characteristic incoming over the line from the distant end, but will not be affected by signals of like characteristics applied to the other or near end of the line.

An object of the invention is to prevent alternating current signals, applied at one end of the line, from affecting associated signal receiving apparatus while at the same time permitting its operation when signal currents of the same characteristics are transmitted over the line from the other end.

In the patent to George Crisson, 1,755,243, issued April 22, 1930, there is disclosed an arrangement comprising a resistance in one side of a line in conjunction with a hybrid coil or 3-winding transformer which is so constructed and arranged that the voltage of signals coming from one direction over the line will be increased in value and applied to an associated signal receiving circuit, and the voltage of signals coming from the other direction so attenuated or reduced as not to affect the signal receiving apparatus.

Although it is theoretically possible to design an arrangement, as described by Crisson, which will function in the manner described, even under extreme conditions, yet it may happen, in practice, that it is impracticable from a cost and space standpoint to provide suitable hybrid coil arrangements which will function perfectly with certain line impedances which may be encountered. This is particularly true where the receiving apparatus is located at a point in the line where it is subjected to substantially the full strength of the signal current to which it is desired that the receiving apparatus shall be non-responsive. Therefore, directional circuits as proposed by Crisson, unless constructed very accurately and at considerable expense, may fail to function to the extent that a sufficient current leaks through the directional circuit to either cause false operation of the receiving apparatus or, in the case of simultaneous sending and receiving, to disturb the proper operation of the receiving apparatus when responding to the wanted signal currents.

To insure complete directional selectivity in such extreme cases, the present invention contemplates the extension of, or an improvement on, the directional circuit arrangement of Crisson by the addition of an artificial line, electrically equivalent to the transmission line, which is also provided with a similar hybrid coil or directional arrangement, the artificial line being so arranged that on an outgoing ring from the exchange it receives a portion of the ringing current equal to that applied to the transmission line. In order to overcome the before mentioned leakage through the transmission line directional circuit, the artificial line directional circuit is also connected to the receiving circuit in the same manner, but in an electrically opposite direction to the connection of the transmission line hybrid coil, whereby the leakage currents shunted to the receiving circuit from the transmission line and from the artificial line, oppose and neutralize each other thereby providing a completely effective directional receiving arrangement.

The invention will be understood from the accompanying drawing which discloses the invention applied to a toll line arranged for two way signaling by means of alternating currents, of frequencies within the voice range, similar in character to the system described in the copending application of R. S. Bailey et al, Serial No. 488,110, filed October 11, 1930. The toll line is therefore shown terminating at one end in both an inward and an outward operator's position. It will be further assumed that the distant end of the line is similarly terminated.

Outgoing signals

If it is now assumed that the outward operator inserts a cord circuit plug, not shown, into the outward toll line jack 1, the circuit functions thru the terminal equipment, as described in the aforementioned Bailey et al. application (Figs. 1 and 2) to operate relay 2. This connects the source of voice frequency current 3, for example 1400 cycles interrupted at the rate of 20 cycles per second, to the line through resistances 6 and 7 to cause the distant operator's telephone set to be connected to the line and a line, or guard lamp, thereat to be lighted. The resistances 6 and 7 serve both as protection for the frequency source 3 and also as a line terminating resistance in the case of the simultaneous reception and transmission of signals.

Connected in the line is a directional selection circuit or hybrid coil arrangement 4 similar to the arrangement shown in Fig. 6 of the patent to Crisson 1,755,243, previously referred to, which functions as therein described to prevent the 1400 cycle current from flowing into the signal receiving circuit 5 as shown in Fig. 3 of the before referred to Bailey et al. application. As previously mentioned however, it may not be practicable to so construct the directional selection arrangement 4 that it will completely block all the signaling current and consequently a certain small portion may leak through, of sufficient magnitude, to cause false operation of, or a disturbance in, the receiving circuit 5. Hence, the necessity under these conditions, of the present invention.

When relay 2 operated it also connected the frequency source 3 to the auxiliary line 8 which terminates in the balancing network 9 so constructed and arranged as to exactly balance the electrical characteristics of the main line.

Connected in the auxiliary line 8 between the contacts of relay 2 and the balancing network 9 is a directional selection circuit or hybrid coil arrangement 10 identical in characteristics with the arrangement 4 in the main line and also connected to the input circuit of the signal receiving circuit 5 in multiple with directional selection arrangement 4 but in an opposite or reverse direction, i. e., it will be noted that the lead 11 from the tip conductor of auxiliary line 8 is connected in multiple with the connection to the ring conductor of the main line and the lead 12 connects the ring conductor of the auxiliary line in multiple with the tip conductor of the main line.

Due to the fact that the auxiliary line, comprising the hybrid coil 10 and the line balancing network 9, is symmetrical in every respect with the main line, comprising the hybrid coil arrangement 4, but connected to the signal receiving circuit with the corresponding leads reversed, it will be obvious that a voltage applied across the input terminal of the receiving circuit by the directional selection circuit 4 is neutralized both as to magnitude and phase by the voltage applied by the directional circuit 10. Consequently, any leakage to the signal receiving circuit which may occur due to the inefficiency of directional circuit 4 is balanced out by an identical leakage thru the duplicate directional circuit 10.

*Incoming signals*

Voice frequency signals incoming over the main line from the distant end are impressed on the signal receiving circuit 5 through windings 13 and 14 of directional selection circuit 4 with slight if any attenuation. Directional selection circuit 10, at this time, merely acts as a high impedance shunt across the input of the signal receiving circuit 5.

What is claimed is:

1. In a signaling system, a transmission line of given characteristics, an artificial line of like characteristics associated with said transmission line at the near end thereof, means for projecting signaling current over said transmission line from the far end thereof, means at the near end for projecting signaling current simultaneously over said transmission line and said artificial line, a signal receiving circuit associated with said transmission line at the near end thereof, a hybrid coil arrangement in said transmission line which permits a portion of the signaling current projected thereover to be shunted into said signal receiving circuit, and a similar hybrid coil arrangement in said artificial line which permits an equal portion of the signaling current applied thereto to be shunted into the same signal receiving circuit, the connection of said signal receiving circuit to said transmission line being reversed with respect to the connection of the signal receiving circuit to said artificial line.

2. In a directional signal receiving system, a main line having a near end and a far end, an exchange terminating the near end thereof, an artificial line associated with the near end of said main line, the electrical characteristics of which are equivalent to said main line, means for transmitting alternating signal current of a predetermined value over the main line from the far end thereof, means at the exchange for applying alternating signal current of like value to the near end of the main line and to the artificial line, simultaneously, a signal receiving circuit responsive to alternating current of the value transmitted from the far end of the main line, a directional circuit comprising a hybrid coil arrangement for associating the receiving circuit with the near end of the main line so constructed and arranged that the voltage of currents transmitted from the far end of the main line and passing into the receiving circuit will not be materially attenuated thereby, and those currents applied to the near end of the main line passing into the receiving circuit substantially reduced in voltage, and a similar directional circuit associating the receiving circuit with the artificial line but in an opposing direction with respect to the association of the receiving circuit and the main line.

3. In a directional signal receiving system, a transmission line, an artificial line electrically equivalent thereto at one end thereof, means for applying alternating signal current of definite characteristics to one end of the transmission line and current of the same characteristics to the other end of the transmission line and to the artificial line, simultaneously, a signal receiving circuit responsive to said alternating signal current, a circuit for connecting the receiving circuit in shunt to the main line including a hybrid coil arrangement so constructed and arranged that the shunted portion of the signal current arriving over the transmission line from the one end thereof, enters the receiving circuit at an increased potential value and the voltage of the portion shunted from the current applied at the other end of the transmission line is materially reduced in voltage, and a similar hybrid coil arrangement connecting the receiving circuit and the artificial line, but in an electrically opposing direction with respect to the connection of the receiving circuit to the transmission line.

4. In a directional signal receiving system, a transmission line, an artificial line electrically equivalent thereto at one end thereof, means for applying alternating signal current of definite characteristics to one end of the transmission line and current of the same characteristics to the other end of the transmission line and to the artificial line, simultaneously, a signal receiving circuit responsive to said alternating signal currents, a circuit for connecting the receiving circuit in shunt to the transmission line including a hybrid coil arrangement and a second circuit including a similar hybrid coil arrangement for connecting the receiving circuit to the artificial line but in an electrically opposing direction with respect to the transmission line connection, said hybrid coil arrangements being so constructed and connected that the voltage of said alternating currents applied to said other end of the transmission line and artificial line simultaneously, are substantially absorbed before entering the receiving circuit.

In witness whereof, I hereunto subscribe my name this 5th day of September, 1930.

JOHN MESZAR.